United States Patent [19]

Gilbert

[11] 4,128,179
[45] Dec. 5, 1978

[54] BALE LOADER

[76] Inventor: C. Keith Gilbert, Box 140, Rte. 1, Tonkawa, Okla. 74653

[21] Appl. No.: 787,469

[22] Filed: Apr. 14, 1977

[51] Int. Cl.² .............................................. E02F 3/72
[52] U.S. Cl. ................................ 214/1 HH; 172/443; 214/DIG. 10
[58] Field of Search ............ 214/1 HH, 86 A, 130 R, 214/DIG. 10; 172/443

[56] References Cited

U.S. PATENT DOCUMENTS

| | | | |
|---|---|---|---|
| 2,360,654 | 10/1944 | Day | 214/86 A |
| 3,184,082 | 5/1965 | Hall | 214/130 R |
| 3,471,033 | 10/1969 | Drury | 214/130 R |
| 3,883,020 | 5/1975 | Dehn | 214/86 A |
| 3,974,880 | 8/1976 | Filan et al. | 214/130 R |
| 4,015,737 | 4/1977 | Wright et al. | 214/1 HH |

*Primary Examiner*—Albert J. Makay
*Assistant Examiner*—Ross Weaver

*Attorney, Agent, or Firm*—Robert M. Hessin

[57] ABSTRACT

Apparatus for loading objects, particularly large cylindrical hay bales upon a motor truck. The bale loader includes a frame which is comprised of a first frame section which is to be semipermanently mounted upon the motor truck, and a demountable second frame section to which the remainder of the bale loader apparatus is attached. To this demountable frame section is attached a boom which is operated by means of a winch and winch line. The boom is in turn connected to a standard tractor three point bale fork. This apparatus in combination with a standard motor truck can be used to lift a large cylindrical hay bale from the ground to a traveling position above the bed of the motor truck, then transport the bale to another location and lower the bale to the ground. In an alternative embodiment of the invention the bale fork is replaced by a lifting boom to create a small crane for lifting and transporting miscellaneous items.

17 Claims, 4 Drawing Figures

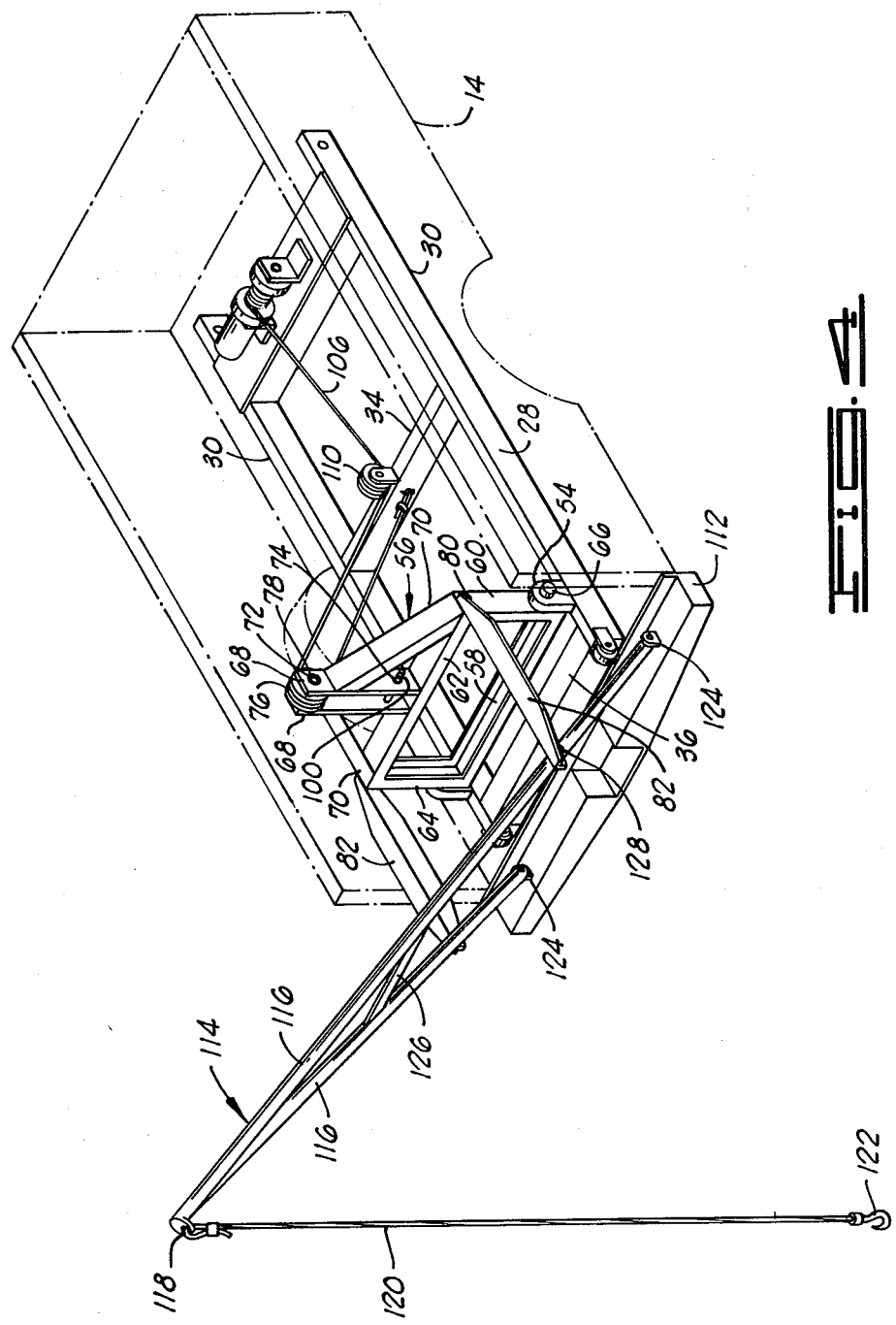

BALE LOADER

BACKGROUND OF THE INVENTION

1. Field of the Invention

This invention relates generally to apparatus for loading objects upon movable vehicles, and more particularly, but not by way of limitation, to apparatus for loading a single relatively large cylindrical hay bale upon a motor truck.

2. Description of the Prior Art

Hay bales are generally divided into two broad classes. One class being comprised of those relatively small bales which are of such a size and weight that they can be lifted by one man. The other class being comprised of those relatively large bales which must be handled by machinery. This invention is particularly concerned with this second class. Hay bales within this class of relatively large bales are typically constructed in the geometrical configuration of either a cylinder or a rectangular parallelepiped with each dimension on the order of approximately six to eight feet. More specifically, the relatively large cylindrical hay bales are 7 to 8 feet in length, with a diameter of 6 to 7 feet and weigh approximately 15 hundred pounds. All references to hay bales in the remainder of this application are referring to these relatively large cylindrical bales unless specifically stated otherwise, but the scope and spirit of this invention encompass the use of the apparatus of the present invention for lifting many types of objects, as will be evident to those skilled in the art.

The typical manner of handling these bales in the prior art is by means of a tractor and a standard tractor three point bale fork. The mechanism used with a tractor generally is in one of two forms. First the mechanism may simply comprise a standard tractor three point bale fork, the outer two mounting points of which are pivotally connected to the frame of the tractor or to some structural member rigidly attached thereto, and the center mounting point of which is attached to and actuated by a hydraulic cylinder or the power take off to pivot the bale fork about the two outer mounting points. In this manner the bale fork is located in a relatively fixed position very near the ground. To move a hay bale the prongs of the bale fork are tilted downward and forced under the hay bale, then the prongs of the bale fork are tilted upward by moving the center mounting point of the bale fork towards the tractor thereby lifting the hay bale a small distance about the ground and permitting it to be transported to another location. In its second form the mechanism is comprised of an attachment which converts the tractor into a fork lift machine thereby permitting the machine to lift the bales several feet above the ground so that the bales could be loaded upon a motor truck if desired.

The tractor and bale fork combination may be used alone, in which case the tractor is used to lift the bale from its original location, transport it to the desired location and then lower it to its final resting place. Alternatively, the tractor-fork lift combination may be used in conjunction with a motor truck, whereby the tractor lifts the bale from its original location and loads it upon the motor truck, the motor truck then transporting the bale to near its final location, where it is then unloaded by a second tractor-fork lift.

There are several disadvantages to the use of a tractor for handling these bales. Tractors are slow, they are inconvenient when used to transport the bales along a public road, and the tractor is an expensive piece of machinery which is more profitably used for purposes other than the mere handling of hay bales. Also the tractor may be attached to other machinery and the process of disconnecting the other machinery and connecting the bale loading apparatus may consume several hours. Recognizing these disadvantages I have invented means by which the bales can be loaded upon a standard motor truck, transported to another location, and unloaded from the motor truck without the use of a tractor.

SUMMARY OF THE INVENTION

The bale loading apparatus of the present invention includes a first frame section having disposed therein a pair of mounting pin receiving holes, means for connecting the first frame section to the bed of a motor truck, a demountable second frame section having disposed therein a second pair of mounting pin receiving holes located so as to align with the mounting pin receiving holes in the first frame section when the second frame section is mounted upon the bed, a pair of mounting pins for insertion through the mounting pin receiving holes in the first and second frame sections to fixedly connect the first and second frame sections, a boom pivotally attached to the demountable second frame section, a standard tractor three point bale fork, and a pair of spaced rollers attached to the demountable second frame section.

Also included is a pair of rigid connecting members each pivotally attached at one end to the boom and at the other end to the bale fork, each of the rigid connecting members having a flat surface rollably engaging one of the rollers so that the rollers and rigid connecting members act as a fulcrum and lever to lift the bale fork and hay bale.

A flexible connecting member is attached at one end to the bale fork and at the other end to the boom to control the angular position of the bale fork relative to the pair of rigid connecting members about the points of the pivotal attachments therebetween. The dimensions of the flexible connecting member, the bale fork, the rigid connecting members, the boom and the dimensions between the rollers and the points of pivotal attachment between the boom and the second frame section are such that when the bale fork is not in contact with the ground the center of gravity of the bale fork and the hay bale is located so as to cause the bale fork to pivot about the points of pivotal attachment between the bale fork and the pair of rigid connecting members and to pull taut the flexible connecting member.

A means for rotating the boom about its pivotal attachment to the second frame section is provided and is comprised of an electrically powered winch attached to the demountable second frame section, a pulley, rotatably mounted upon the boom, and a winch line, connected at one end to the winch and at the other end to the demountable second frame section, with an intermediate portion thereof wrapped around the pulley, so that as the winch line is wound upon the winch a force is thereby exerted on the pulley causing the boom to pivot about the points of attachment to the second frame section, thereby translating the rigid connecting members across the rollers to lift the bale fork and hay bale into a traveling position above the bed of the truck.

An alternative embodiment of the present invention is a crane apparatus for mounting upon a motor truck, which includes a frame, means for mounting the frame on the truck, a first boom pivotally attached to the frame, a lifting boom pivotally attached to one of said frame and said truck, a rigid connecting member, pivotally attached at one end to the first boom and at the other end to the lifting boom, and means for rotating the first boom about its pivotal connection to the frame, whereby the lifting boom is also pivoted about its point of attachment to one of said frame and said truck.

The dimensions of the first boom, the rigid connecting member, the lifting boom and the dimension between the point of pivotal attachment of the lifting boom to one of said frame and said truck and the point of pivotal attachment of the first boom to the frame are such that when the first boom has reached its maximum forward position, the upper end of the lifting boom will be at a position to the rear of the lower end of the lifting boom.

It is, therefore, a general object of the present invention to provide an apparatus for loading miscellaneous articles upon a motor truck.

A further object of the present invention is to provide a bale loading apparatus for loading and unloading large cylindrical hay bales from a motor truck without the use of a tractor.

Another object of the present invention is to provide an apparatus which can be used in combination with a standard tractor three point bale fork, to load and unload large cylindrical hay bales from a motor truck without the use of a tractor.

Yet another object of the present invention is to provide an apparatus, to be attached to a motor truck, for lifting a large cylindrical hay bale from the ground to a stable position above the bed of the motor truck, so that the motor truck can then transport the apparatus and the hay bale to another location where the bale is lowered back to the ground.

Yet a further object of the present invention is to provide an improved crane apparatus for attachment to a motor truck for lifting miscellaneous articles.

Other and further objects, features and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is partially exploded to show the manner in which the two sections of the demountable frame are connected.

FIG. 4 is an oblique view of an alternative embodiment of the present invention which replaces the standard bale fork with a lifting boom to convert the bale loader into a crane.

DETAILED DESCRIPTION OF THE PREFERRED EMBODIMENTS OF THE INVENTION

Figure 1:
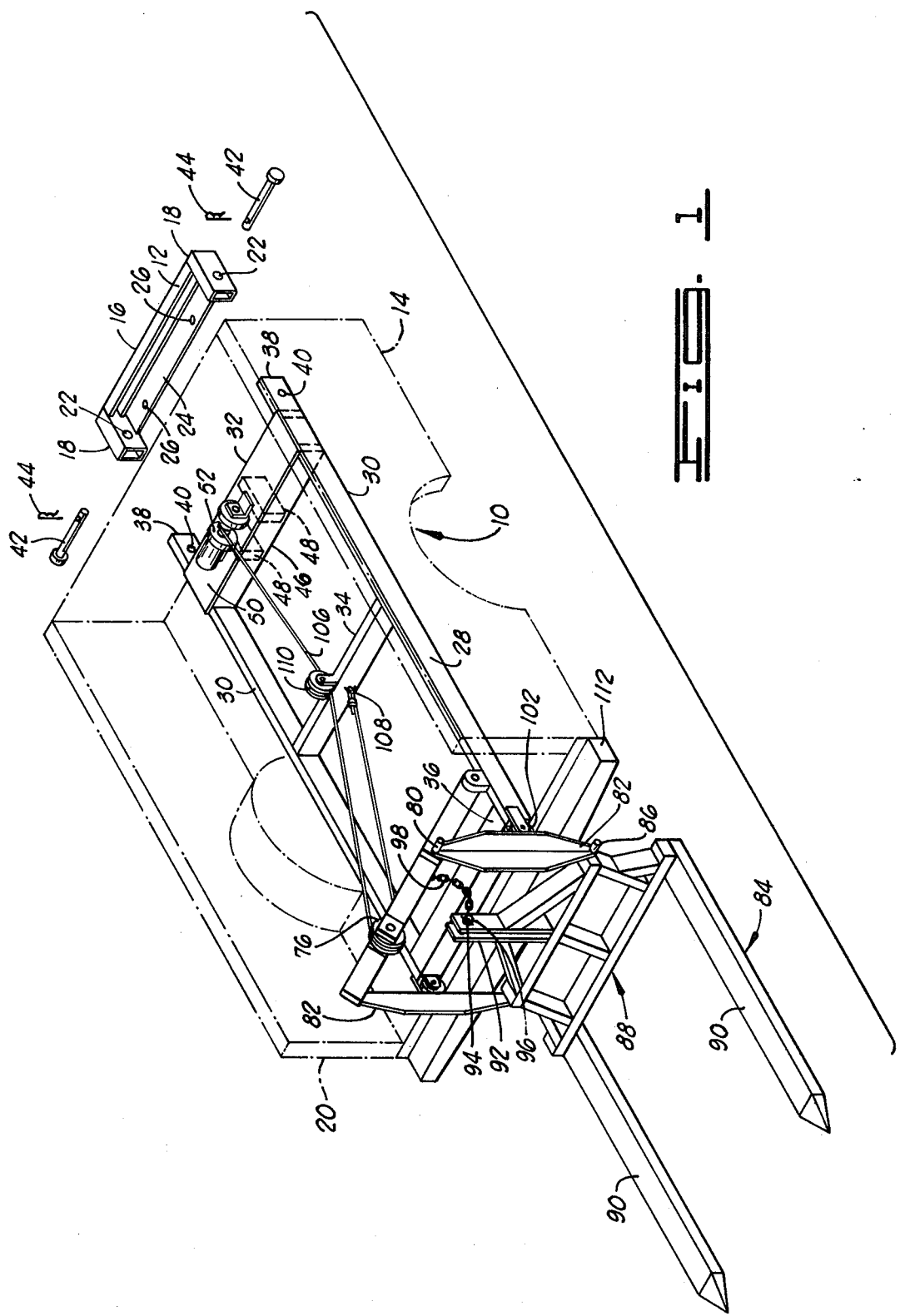
FIG. 1 is an oblique view of the bale loader of the present invention showing the manner in which the bale loader would be mounted upon the bed of a conventional motor truck.

Referring now to the drawings, and particularly to FIG. 1, the bale loader of the present invention is illustrated and generally designated by the numeral 10. The bale loader 10 includes a first frame section 12 for semi-permanent attachment to the motor truck 14. The only portion of the truck 14 which is shown is the rear bed portion upon which the bale loader is mounted. The frame section 12 has a channel shaped member 16 which is located in a horizontal plane, transverse to the length of the truck. Attached to each end of the channel member 16 is a box shaped member 18 located perpendicular to and welded to the channel 16. The box members 18 are open on the side facing towards the rear end 20 of the truck. Each box member 18 has disposed therein a pair of mounting pin receiving holes 22 located upon an axis parallel to the channel member 16. A plate member 24 is welded across the bottom surface of the channel 16 and the box members 18. Disposed within the plate 24 are two mounting holes 26 by means of which the frame section 12 can be bolted to the frame or bed of the truck 14.

A demountable second frame section 28 is comprised of two longitudinal channel members 30, a front cross member 32, a center cross member 34, and a rear cross member 36. The demountable frame section 28 is constructed so that the forward ends 38 of longitudinal members 30 extend forward of front cross member 32, and the forward ends 38 each have disposed therein a mounting pin receiving hole 40 located about an axis parallel to the channel member 16. To mount the demountable frame section 28 upon the truck 14, the forward end 38 of longitudinal members 30 are inserted within the rear openings of the box members 18 so that the holes 40 are aligned with the holes 22. The two frame sections are then secured together by means of mounting pins 42 which are inserted through the holes 40 and 22 and are in turn secured in place by the cotter pins 44. This arrangement permits all of the bale loader except for the frame section 12 to be demounted from the truck by merely removing the mounting pins 42. This permits the truck to be used for other normal purposes and then, when desired, the bale loader can be rapidly mounted upon the truck by sliding the demountable frame section 28 into engagement with the first frame section 12 and inserting the mounting pins 42.

The front cross member 32 is comprised of two transverse channel members 46 welded at each end to one of the longitudinal channel members 30. Located between the transverse channel members 46 and inward of the longitudinal channel members 30 are two stiffener members 48, and welded across the top of the transverse members 46 is a winch mounting plate 50. Mounted atop the plate 50 is a standard electrically operated winch 52. The electric winch 52 could alternatively be replaced by a manually powered winch.

As is best shown in FIG. 4, there is mounted upon the top surface of each of the longitudinal members 30, at a location between the center cross member 34 and the rear cross member 36 a standard bearing support 54. Pivotally attached to the demountable frame section 28 by means of the bearing supports 54 is a boom generally designated by the numeral 56.

The boom 56 is comprised of a rectangular frame having sides 58, 60, 62 and 64. Attached to each of the lower outside surfaces of sides 60 and 64 is a boom axle 66. The boom 56 is connected to the bearing supports 54 by means of the boom axles 66 which are fixedly attached to the boom 56 and which rotatingly engage the inner races of the bearing supports 54. Rigidly attached to the outer surface of the side 62 is a pair of spaced pulley support plates 68 located halfway between and parallel to the sides 60 and 64. Each of the pulley support plates 68 is held rigidly in place by means of a brace 70 which is welded in place between each plate 68 and the side 62. Disposed within each plate 68 is a pulley mounting hole 72 near the upper end thereof and a chain attachment hole 74 near the lower end thereof. The pair of holes 72 are concentric and mounted therebetween is a boom pulley 76 which is rotatingly mounted upon a pulley mounting pin 78 which is inserted through the holes 72 and the boom pulley 76. The pair of chain attachment holes 74 are concentric.

Attached to each of the upper outside surfaces of sides 60 and 64 is a connecting member mounting pin 80. As is best shown in FIG. 1 there is pivotally attached to each of the mounting pins 80 a connecting member 82, which is held in place by means of a standard cotter pin. The mounting pins 80 could also be threaded to receive a standard nut to hold the connecting member 82 in place. The other end of each connecting member 82 is pivotally attached to the standard tractor three point bale fork, generally denoted by the numeral 84, by means of an outer bale fork mounting pin 86. Here again, the connecting member 82 is held in place by means of a standard cotter pin. The outer bale fork mounting pins 86 could be threaded to receive a standard nut to hold the connecting member 82 in place. The standard tractor three point bale fork 84 is used both as a matter of convenience and economy. Most persons who are involved in the moving of hay bales will already have access to this standard bale fork, therefore, the design of the bale loader of this invention permits those persons to use their existing bale fork in conjunction with the bale loader apparatus of this invention, and thereby effects an economic savings since it is unnecessary for those persons to purchase a second bale fork. It is recognized, however, that the standard tractor three point bale fork 84 can be replaced by a bale fork designed especially for use with a bale loader for motor trucks and still be within the scope of this invention.

The bale fork 84 is comprised of a rigid frame, generally denoted by the numeral 88, and a pair of prongs 90. The rigid frame 88 includes a vertical attachment member 92 which has disposed therein a pair of attachment holes 94. Inserted through the holes 94 is the central bale fork mounting pin 96, which is held in place by a standard cotter pin. The central bale fork mounting pin 96 along with the two outer bale fork mounting pins 86 are the three mounting points on the standard tractor three point bale fork which are normally used to connect the bale fork to a tractor. The bale fork is connected to the remainder of the apparatus of the present invention by these same three mounting points. As previously mentioned, each of the connecting members 82 is pivotally connected to one of the outer bale fork mounting pins 86. Connected to the central bale fork mounting pin 96 is one end of a connecting chain 98, the other end of which is attached to the boom 56 by means of a central boom attachment pin 100 which is inserted through the pair of concentric holes 74 within the pulley support plates 68, as is best shown in FIG. 4, and is held in place by means of a standard cotter pin. The chain 98 could be replaced by any flexible connecting member.

Mounted upon the rear ends of each of the longitudinal channel members 30 is a roller 102. The connecting members 82 are made from angle shaped structural steel members and are so oriented and located that one of the angle surfaces of each of the connecting members 82 slidingly engages one of the rollers 102.

Figure 3:
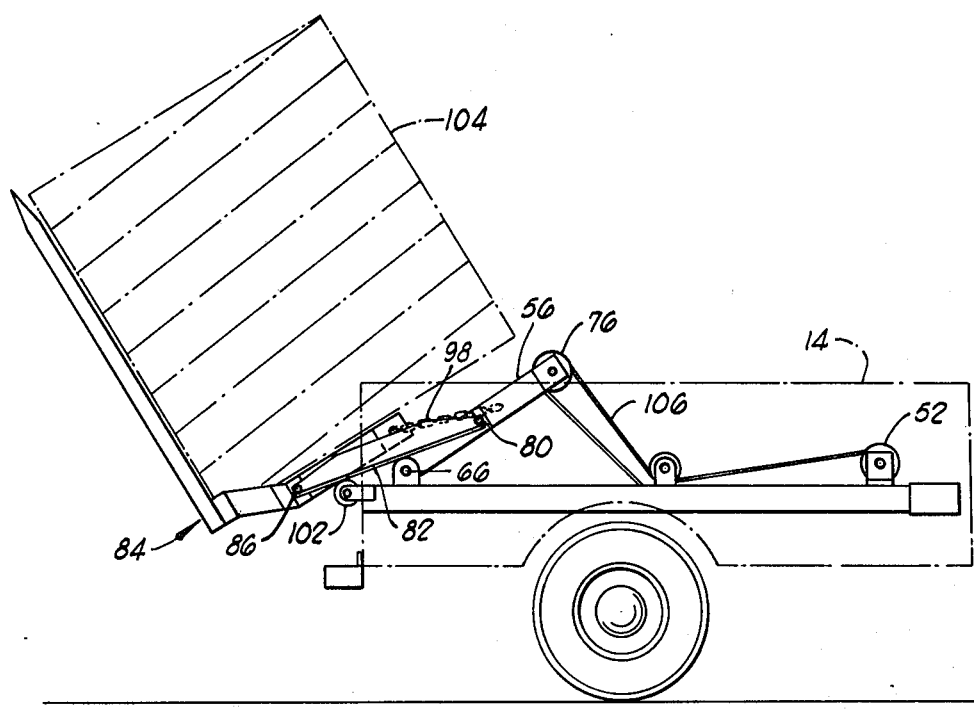
FIG. 3 is a side elevational view of the bale loader in the up or travel position.

The dimensions of the chain 98, the bale fork 84, the connecting members 82, the boom 56 and the dimension between the rollers 102 and the boom axles 66 are such that when the bale fork 84 is not in contact with the ground the center of gravity of said bale fork either when empty or when loaded with a hay bale 104, is behind the outer bale fork mounting pin 86 so that the weight of the bale fork and bale tends to pivot the bale fork counterclockwise, as seen in FIG. 3, about the outer bale fork mounting pins 86, thereby pulling taut the chain 98.

Fixedly attached to the center cross member 34 of the demountable frame section 28 is one end of the winch line 106, by means of a winch line attachment bolt 108. The winch line 106 then passes under around and over the boom pulley 76, then back under an intermediate pulley 110 which is mounted on top of the center cross member 34, and finally is wound upon the winch 52.

Figure 2:
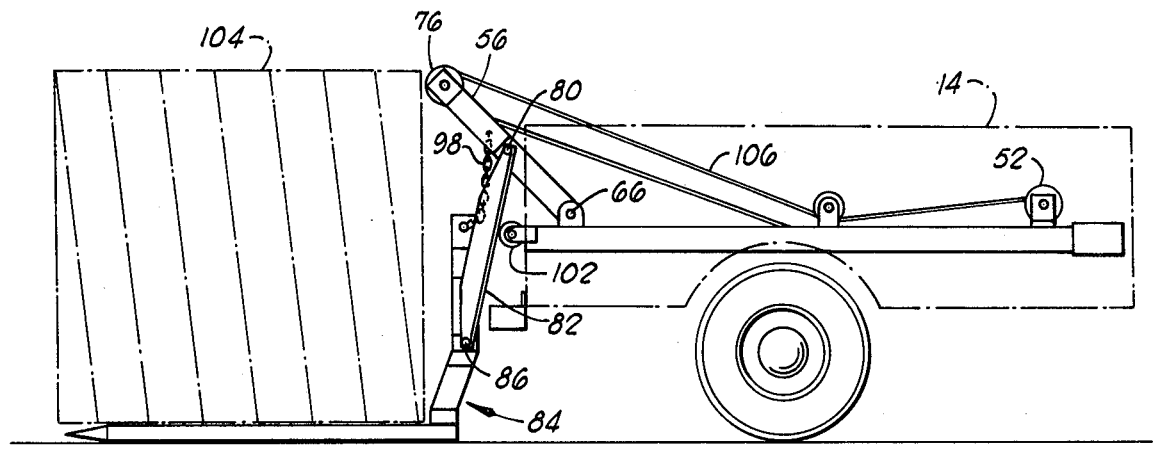
FIG. 2 is a side elevational view of the bale loader in the down or float position.

In operation, the truck 14 is first located with its rear end 20 at a position about 10 feet ahead of the bale 104, and with the prongs 90 pointing towards a circular end of the bale 104. Then the winch line 106 is payed off the winch 52 so that the bale fork 84 is lowered to the ground. The truck 14 is then backed towards the bale 104 forcing the prongs 90 under the bale 104 as is shown in FIG. 2. Truck bumper 112 urging against connecting members 82 aid in positioning of prongs 90. Then to load the bale 104 upon the truck 14 the winch line 106 is wound upon the winch 52. As the winch line 106 is wound upon the winch 52 is pulls the boom pulley 76 towards the winch 52, thereby rotating the boom 56 clockwise, as it is seen in FIG. 2, about the axis of the boom axle 66. The use of the pulley 76, as opposed to fixedly connecting the winch line 106 to the boom 56, doubles the force pulling upon the boom 56 thereby halving the force required to be provided by the winch 52. As the boom 56 rotates clockwise it pulls along with it the connecting members 82, which in turn pull along the bale fork 84, which in turn lifts and pulls forward the bale 104.

As the connecting members 82 are pulled forward they are rollingly engaged by the rollers 102 which act as a bearing means to support much of the weight of the connecting members 82, the bale fork 84 and the bale 104. The rollers 102 also act as a fulcrum and the connecting members 82 act as levers whereby the force from the boom 56 is transmitted to the bale fork 84. The dimensions between the rollers 102, the boom axles 66 and the connecting member mounting pins 80 are such that the leverage effect of the lever and fulcrum continually increases as the boom 56 pivots forward, again reducing the force required to be provided by the winch 52. The apparatus could be constructed without the rollers 102 by merely allowing the connecting members 82 to slidably engage the top edge of the rear end of the longitudinal channel members 30, or even by allowing the connecting members 82 to slidably engage the upper rear surface of the bed of the truck 14 or the rear bumper 112 of the truck 14. In such a construction, the bearing means supporting the weight of the bale fork 84 and bale 104 and acting as a fulcrum for the connecting members 82 would be that rear top edge of the longitudinal channel members 30 or the bed or rear bumper 112 of the truck 14. Such a construction is workable and encompassed within the scope of this invention, the only disadvantage of such construction being that the relatively higher friction of the sliding contact as compared to the rolling contact provided by the rollers 102 increases the force required to be exerted by the winch 52.

When the bale fork 84 is in the down position as shown in FIG. 2, the chain 98 is slack. As the boom 56 is pivoted forward pulling along with it the connecting members 82 and the bale fork 84, the bale fork 84 begins to lift from the ground and pivots counterclockwise, as seen in FIG. 2, about the axis of the outer bale fork mounting pins 86, until the chain 98 becomes taut. Once the chain 98 becomes taut, the angular position of the bale fork 84 relative to the connecting members 82 about the pivoted connection at the outer bale fork mounting pins 86 becomes fixed.

As the winch line 106 is further wound upon the winch 52 the boom 56 continues to pivot forward until it reaches the up or travel position as shown in FIG. 3. The truck 14 then transports the bale 104 to the desired location and the winch line 106 is then payed off the winch 52 thereby lowering the bale 104 back to the ground.

In viewing FIG. 3, the criticality of the dimensions of the various components of this apparatus in relation to the stability of the hay bale 104 in the up or travel position becomes apparent. As mentioned above, the dimensions of the chain 98, the bale fork 84, the connecting members 82, the boom 56 and the dimension between the rollers 102 and the boom axles 66 are such that when the bale fork 84 is not in contact with the ground the center of gravity of the bale fork either when empty or when loaded with the hay bale 104, is behind the outer bale fork mounting pins 86 so that the weight of the bale fork 84 and the bale 104 tends to pivot the bale fork counterclockwise as seen in FIG. 3 about the axis of the outer bale fork mounting pins 86, thereby keeping the chain 98 taut. If the dimensions of those members were such that the center of gravity of the bale fork 84 and the bale 104 ever was ahead of the pins 86, the bale fork 84 would pivot uncontrollably clockwise spilling the bale 104. Furthermore, the angle between the boom 56 and the resultant of the forces exerted by the winch line 106 upon the boom pulley 76 is important. The forces exerted on the boom 56 by the weight of the bale fork 84 and the bale 104 tend to pivot the boom 56 counterclockwise, as seen in FIG. 3 about the axis of the boom axles 66. This is counterbalanced by the forces exerted by the winch line 106 upon the boom pulley 76 tending to pivot the boom 56 clockwise. The force required to be exerted by the winch 52 to supply this clockwise moment is dependent upon the angle between the boom 56 and the resultant of the forces exerted by the winch line 106 upon the boom pulley 76. If that resultant is at a right angle to the boom 56 the force required to be supplied by the winch 52 is minimized, therefore the winch line 106 should be located so as to make that resultant as nearly as possible at a right angle to the boom 56.

As an alternative embodiment of the present invention, the bale fork 84 can be replaced by a lifting boom generally denoted by the numeral 114 as is shown in FIG. 4 to create a crane for lifting miscellaneous objects. The lifting boom 114 is comprised of two cylindrical load carrying members 116 which are welded together at their upper ends and to which combined upper ends is welded a steel eyelet 118 to which is connected one end of a boom line 120, the other end of said boom line 120 being attached to a lifting hook 122. The lower ends of the two cylindrical load carrying members 116 are each pivotally connected to the rear bumper 112 of the truck 14 by means of the lifting boom mounting pins 124. The two cylindrical load carrying members 116 are braced together by means of a plurality of cross braces 126 welded therebetween so that said load carrying members 116 and said cross braces 126 form a rigid structure which pivots about said lifting boom mounting pins 124. Welded to the outer edge of each of the two cylindrical load carrying members is a connecting member mounting pin 128 to which is pivotally connected one of the connecting members 82.

In the operation and use of this alternative embodiment the object to be lifted is attached to the lifting hook 122. Then the winch line 106 is wound upon the winch 52 thereby pivoting the boom 56 forward which in turn pulls the connecting members 82 forward which in turn pivots the lifting boom 114 forward about the pivot points provided by the lifting boom mounting pins 124. This in turn raises and moves forward the lifting hook 122 thereby lifting the object off the ground. The dimensions of the boom 56, the connecting members 82, the lifting boom 114 and the dimension between the lifting boom mounting pins 124 and the boom axles 66 are such that when the boom 56 has reached its maximum forward position, the steel eyelet 118 will be at a position to the rear of the lifting boom mounting pins 124. Such a construction is preferred because it prevents the lifting boom from being pivoted so far forward that the boom line 120 would contact the cross braces 126 thereby interfering with the proper operation of the crane. This built-in limitation of travel is most important. If the lifting boom were permitted to pivot past the apex, that is past a vertical position, there would be no counterbalancing force to prevent it from then falling foward in an uncontrollable manner.

Thus the apparatus for loading objects upon movable vehicles of the present invention is well adapted to carry out the objects and attain the ends and advantages mentioned as well as those inherent therein. While presently preferred embodiments of the invention have been described for the purpose of this disclosure, numerous changes in the construction and arrangement of parts can be made by those skilled in the art, which changes are encompassed within the spirit of this invention as defined by the appended claims.

What is claimed is:

1. An apparatus for use with a standard tractor three point bale fork for lifting a hay bale onto the bed of a motor truck comprising:

a frame;

means for mounting said frame on said bed;

a boom pivotally attached to said frame;

a rigid connecting member having two ends, the first of which is pivotally attached to said boom and the second of which is pivotally attached to said bale fork;

means for controlling the angular position of said bale fork relative to said rigid connecting member about the point of said pivotal attachment therebetween;

means for rotating said boom about said pivotal attachment to said frame to raise or lower said connecting member and said bale fork relative to said frame; and a roller, attached to one of said frame and said truck, rollably engaged by said rigid connecting member, to partially support the weight of said rigid connecting member, said bale fork and said bale.

2. The apparatus of claim 1 wherein said frame is a demountable frame comprising:
a first frame section for mounting on said bed;
a demountable second frame section to which said boom, said roller and said rotating means are attached so that all parts of said apparatus other than said first frame section can be removed intact from said motor truck; and
means for connecting said second frame section to said first frame section.

3. The apparatus of claim 2 further comprising:
a second roller, said first and second rollers comprising a pair of spaced concentric rollers attached to the rear end of said demountable second frame section; and
a second rigid connecting member pivotally attached at one end to said boom and at the other end to said bale fork, said first and second rigid connecting members each having a flat surface rollably engaging the surface of one of said rollers.

4. The apparatus of claim 3 wherein:
said controlling means is comprised of a flexible connecting member attached at one end to said bale fork and at the other end to said boom, the dimensions of said flexible connecting member, said bale fork, said rigid connecting members, said boom and the dimension between said rollers and said pivotal attachment between said boom and said second frame section being such that when said bale fork is not in contact with the ground the center of gravity of said bale fork and bale is behind the points of said pivotal attachment of said bale fork to said rigid connecting members.

5. The apparatus of claim 4 wherein said rotating means is comprised of:
winch means attached to said demountable second frame section;
a pulley rotatably mounted upon said boom; and
a winch line connected at one end to said winch means and at the other end to said second frame section, with an intermediate portion thereof emplaced about said pulley so that upon rotation of said winch means said boom will be pivoted about said pivotal attachment between said boom and said demountable second frame section.

6. The apparatus of claim 5 wherein said winch means is an electrically powered winch.

7. A loading apparatus for lifting hay bales and similar articles onto a motor truck comprising:
a frame;
means for mounting said frame on said truck;
a boom pivotally attached to said frame;
a bale fork;
a rigid connecting member pivotally attached at one end to said boom and at another end to said bale fork;
bearing means, attached to one of said frame and said motor truck, slidably engaged by said rigid connecting member, to partially support the weight of said rigid connecting member, said bale fork and the article being loaded;
means for controlling the angular position of said bale fork relative to said rigid connecting member about the point of said pivotal attachment therebetween; and
means for rotating said boom about said pivotal attachment to said frame to translate said rigid connecting member across said bearing means to raise or lower said bale fork relative to said frame.

8. The apparatus of claim 7 wherein:
said bale fork is a standard tractor three point bale fork.

9. The apparatus of claim 7 wherein said frame is a demountable frame comprising:
a first frame section;
a demountable second frame section to which said boom, said bearing means, and said rotating means are attached so that all parts of said apparatus other than said first frame section can be removed intact from said motor truck; and
means for connecting said second frame section to said first frame section.

10. The apparatus of claim 9 wherein said bearing means is further characterized to include a pair of spaced rollers attached to said second frame section; and which is further comprised of a second rigid connecting member pivotally attached at one end to said boom and at the other end to said bale fork, said first and second connecting members each having a flat surface rollably engaging the surface of one of said rollers.

11. The apparatus of claim 10 wherein:
said bale fork is a standard tractor three point bale fork.

12. The apparatus of claim 10 wherein:
said controlling means is comprised of a flexible connecting member attached at one end to said bale fork and at the other end to said boom, the dimensions of said flexible connecting member, said bale fork, said rigid connecting members, and the dimension between said rollers and said point of pivotal attachment between said boom and said second frame section being such that when said bale fork is not in contact with the ground the center of gravity of said bale fork and the article being loaded is behind said pivotal attachments of said bale fork to said rigid connecting members.

13. The apparatus of claim 12 wherein said bale fork is a standard tractor three point bale fork.

14. The apparatus of claim 10 wherein said rotating means is comprised of:
winch means attached to said demountable second frame section;
a pulley, rotatably mounted upon said boom; and
a winch line connected at one end to said winch means and at the other end to said second frame section, with an intermediate portion thereof wrapped around said pulley, so that upon rotation of said winch means said boom will be rotated about said pivotal attachment between said boom and said demountable second frame section.

15. The apparatus of claim 14 wherein said winch means is an electrically powered winch.

16. The apparatus of claim 15 wherein said bale fork is a standard tractor three point bale fork.

17. A bale loader for lifting a large cylindrical hay bale to a traveling position above the bed of a motor truck comprising:
a first frame section having disposed therein a pair of mounting pin receiving holes;
means for connecting said first frame section to said bed;
a demountable second frame section having disposed therein a second pair of mounting pin receiving holes located so as to align with the mounting pin receiving holes in said first frame section when said second frame section is mounted upon said bed;

a pair of mounting pins for insertion through said mounting pin receiving holes in said first and second frame sections to fixedly connect said first and second frame sections;

a boom pivotally attached to said demountable second frame section;

a standard tractor three point bale fork;

a pair of spaced rollers attached to said demountable second frame section;

a pair of rigid connecting members each pivotally attached at one end to said boom and at the other end to said bale fork, each of said rigid connecting members having a flat surface rollably engaging one of said rollers so that said rollers and rigid connecting members act as a fulcrum and lever to lift said bale fork and hay bale;

a flexible connecting member attached at one end to said bale fork and at the other end to said boom to control the angular position of said bale fork relative to said pair of rigid connecting members about the points of said pivotal attachments therebetween, the dimensions of said flexible connecting member, said bale fork, said rigid connecting members, said boom and the dimensions between said rollers and said points of pivotal attachment between said boom and said second frame section being such that when said bale fork is not in contact with the ground the center of gravity of said bale fork and said hay bale is located so as to cause said bale fork to pivot about said points of pivotal attachment between said bale fork and said pair of rigid connecting members and to pull taut said flexible connecting member;

an electrically powered winch attached to said demountable second frame section;

a pulley rotatably mounted upon said boom; and a winch line, connected at one end to said winch and at the other end to said demountable second frame section, with an intermediate portion thereof wrapped around said pulley, so that as the winch line is wound upon said winch a force is thereby exerted on said pulley causing said boom to pivot about said points of attachment to said second frame section, thereby translating said rigid connecting members across said rollers to lift said bale fork and hay bale into a traveling position above the bed of said truck.

* * * * *